US009013332B2

(12) United States Patent
Meis

(10) Patent No.: US 9,013,332 B2
(45) Date of Patent: *Apr. 21, 2015

(54) LASER-BASED SUPERCOOLED LARGE DROP ICING CONDITION DETECTION SYSTEM

(75) Inventor: Charles Steven Meis, Renton, WA (US)

(73) Assignee: The Boeing Company, Chicago, IL (US)

( * ) Notice: Subject to any disclaimer, the term of this patent is extended or adjusted under 35 U.S.C. 154(b) by 120 days.

This patent is subject to a terminal disclaimer.

(21) Appl. No.: 13/421,360

(22) Filed: Mar. 15, 2012

(65) Prior Publication Data

US 2013/0240672 A1    Sep. 19, 2013

(51) Int. Cl.
*G08B 21/00*    (2006.01)
*B64D 15/20*    (2006.01)

(52) U.S. Cl.
CPC ........................ *B64D 15/20* (2013.01)

(58) Field of Classification Search
CPC ........ B64D 15/14; B64D 15/20; B64D 15/22; B64D 43/02; B64C 13/50; B64F 5/0054; G08B 19/02
USPC ......... 340/580–583, 962; 244/134; 73/170.26
See application file for complete search history.

(56) References Cited

U.S. PATENT DOCUMENTS

| 5,028,929 A | | 7/1991 | Sand et al. | |
|---|---|---|---|---|
| 6,052,056 A | * | 4/2000 | Burns et al. | 340/583 |
| 6,091,335 A | * | 7/2000 | Breda et al. | 340/580 |
| 6,253,126 B1 | * | 6/2001 | Palmer | 701/14 |
| 6,269,320 B1 | * | 7/2001 | Otto | 702/127 |
| 6,377,207 B1 | | 4/2002 | Solheim et al. | |
| 8,325,338 B1 | * | 12/2012 | Pope et al. | 356/301 |
| 2002/0159060 A1 | * | 10/2002 | Roques et al. | 356/335 |

(Continued)

FOREIGN PATENT DOCUMENTS

| EP | 1391382 A1 | 2/2004 |
|---|---|---|
| GB | 2329016 A | 3/1999 |

(Continued)

OTHER PUBLICATIONS

Saikia et al., "Raindrop size distribution profiling by laser distrometer and rain attenuation of centimeter radio waves", Indian Journal of Radio & Space Physics, vol. 38, Apr. 2009, pp. 80-85.

(Continued)

*Primary Examiner* — Hai Phan
*Assistant Examiner* — Orlando Bousono
(74) *Attorney, Agent, or Firm* — Yee & Associates, P.C.

(57) ABSTRACT

A method and apparatus for detecting icing conditions. An icing condition detection system comprises a number of sensors and an icing condition detector. The number of sensors is located in a number of locations on an aircraft. A sensor in the number of sensors is configured to emit electromagnetic radiation into drops of water in an environment around the aircraft. The sensor in the number of sensors is configured to detect responses to the electromagnetic radiation. The sensor in the number of sensors is configured to generate data from the responses. The icing condition detector is configured to monitor for the data from the number of sensors. The icing condition detector is further configured to detect a presence of a number of types of icing conditions for the aircraft using the data from the number of sensors.

18 Claims, 8 Drawing Sheets

(56) References Cited

U.S. PATENT DOCUMENTS

| | | | |
|---|---|---|---|
| 2004/0231410 A1* | 11/2004 | Bernard et al. | 73/170.26 |
| 2005/0218268 A1* | 10/2005 | Otto et al. | 244/134 F |
| 2005/0230553 A1* | 10/2005 | Otto et al. | 244/134 F |
| 2008/0110254 A1* | 5/2008 | Zhao et al. | 73/170.17 |
| 2008/0218385 A1* | 9/2008 | Cook et al. | 340/962 |
| 2009/0055036 A1* | 2/2009 | Vozhdaev et al. | 701/14 |
| 2009/0289147 A1* | 11/2009 | Lavaud et al. | 244/134 F |
| 2010/0123044 A1* | 5/2010 | Botura | 244/134 D |
| 2011/0019188 A1* | 1/2011 | Ray et al. | 356/342 |
| 2012/0085868 A1* | 4/2012 | Barnes | 244/134 F |
| 2012/0274938 A1* | 11/2012 | Ray | 356/342 |

FOREIGN PATENT DOCUMENTS

| | | | |
|---|---|---|---|
| WO | WO 91/17457 A1 * | 11/1991 | G01S 13/38 |
| WO | WO 95/04678 A1 * | 2/1995 | B64D 15/20 |
| WO | WO 01/35119 A2 * | 5/2001 | G01S 13/00 |
| WO | WO 03/002410 A1 * | 1/2003 | B64D 15/20 |

OTHER PUBLICATIONS

Sassen et al., "Scattering of Polarized Laser Light by Water Droplet, Mixed-Phase and Ice Crystal Clouds. Part I: Angular Scattering Patterns", Journal of the Atmospheric Sciences, vol. 36, May 1979, pp. 838-851.

Janzen et al., "Analysis of small droplets with a new detector for liquid chromatography based on laser-induced breakdown spectroscopy", Spectrochimica Acta Part B, vol. 60, Nos. 7-8, Aug. 2005, pp. 993-1001.

Lonhert et al., "Profiling Cloud Liquid Water by Combining Active and Passive Microwave Measurements with Cloud Model Statistics", Journal of Atmospheric and Oceanic Technology, vol. 18, Aug. 2001, pp. 1354-1366.

Extended European Search Report, dated Jul. 23, 2014, regarding Application No. EP13157749.6, 5 pages.

* cited by examiner

LASER-BASED SUPERCOOLED LARGE DROP ICING CONDITION DETECTION SYSTEM

CROSS REFERENCE TO RELATED APPLICATIONS

This application is related to U.S. patent application Ser. No. 13/414,894, filed on Mar. 8, 2012, entitled "Supercooled Large Drop Icing Condition Detection System," which is a continuation-in-part of U.S. patent application Ser. No. 13/344,144, filed Jan. 5, 2012, entitled "Supercooled Large Drop Icing Condition Detection System". Both applications are incorporated herein by reference.

BACKGROUND INFORMATION

1. Field

The present disclosure relates generally to detecting icing conditions and, in particular, to icing conditions for an aircraft. Still more particularly, the present disclosure relates to detecting supercooled water drops, including supercooled large drops (SLD).

2. Background

In aviation, icing on an aircraft may occur when the atmospheric conditions lead to the formation of ice on the surfaces of the aircraft. Further, this ice also may occur within the engine. Ice forming on the surfaces of the aircraft, on inlets of an engine, and other locations are undesirable and potentially unsafe for operating the aircraft.

Icing conditions may occur when drops of supercooled liquid water are present. In these illustrative examples, water is considered to be supercooled when the water is cooled below the stated freezing point for water but is still in a liquid form. Icing conditions may be characterized by the size of the drops, the liquid water content, air temperature, and other parameters. These parameters may affect the rate and extent at which ice forms on an aircraft.

When icing occurs, the aircraft does not operate as desired. For example, ice on the wing of an aircraft will cause the aircraft to stall at a lower angle of attack and have an increased level of drag.

Aircraft may have mechanisms to prevent icing, remove ice, or some combination thereof to handle these icing conditions. For example, aircraft may include icing detection, prevention, and removal systems. Ice may be removed using deicing fluid, infrared heating, and other suitable mechanisms.

Aircraft may be certified for operating during different types of icing conditions. Some aircraft may be certified to operate in normal icing conditions but not those that include supercooled large drops. Currently used sensors are unable to differentiate between normal and supercooled large drop icing conditions. Therefore, it would be desirable to have a method and apparatus that takes into account one or more of the issues discussed above as well as possibly other issues.

SUMMARY

In one illustrative embodiment, an icing condition detection system comprises a number of sensors and an icing condition detector. The number of sensors is located in a number of locations on an aircraft. A sensor in the number of sensors is configured to emit electromagnetic radiation into drops of water in an environment around the aircraft. The sensor in the number of sensors is further configured to detect responses to the electromagnetic radiation emitted into the drops of water. The sensor in the number of sensors is further configured to generate data from the responses. The icing condition detector is configured to monitor for the data from the number of sensors. The icing condition detector is further configured to detect a presence of a number of types of icing conditions for the aircraft using the data from the number of sensors.

In another illustrative embodiment, a method for detecting icing conditions is present. A number of sensors on a surface of an aircraft is monitored for data generated from responses to electromagnetic radiation emitted from the number of sensors on the surface of the aircraft into drops of water. A determination is made as to whether a number of types of icing conditions is present using the data from the number of sensors.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of an illustrative embodiment of the present disclosure when read in conjunction with the accompanying drawings, wherein:

DETAILED DESCRIPTION

The illustrative embodiments recognize and take into account a number of different considerations. For example, the different illustrative embodiments recognize and take into account that currently used systems for detecting icing conditions on an aircraft are unable to detect all of the different types of icing conditions that may occur. For example, the different illustrative embodiments recognize and take into account that as the size of the drops of water increases, currently used sensors may not detect icing caused by those drops of water. The different illustrative embodiments recognize and take into account that the locations at which different sizes of drops will collide with an airfoil during operation of an aircraft change, depending on the size of the drops.

In one illustrative embodiment, an icing condition detection system comprises a number of sensors at a number of locations on the surface of an aircraft. A sensor in the number of sensors is configured to emit electromagnetic radiation into drops of water around the aircraft and detect responses to the electromagnetic radiation emitted into the drops of water. The electromagnetic radiation may take various forms. For example, the electromagnetic radiation may be coherent light, a laser beam, or some other type of electromagnetic radiation. In these illustrative examples, the electromagnetic radiation may be invisible to the human eye. The sensors generate data from the responses detected. The icing condition detector is configured to monitor for the data from the number sensors and detect a presence of a number of types of icing conditions for the aircraft using the data from the number of sensors.

As used herein, a "number", when used with reference to items, means one or more items. For example, "a number of types of icing conditions" is one or more types of icing conditions.

The illustrative embodiments recognize and take into account that it is desirable to detect different types of icing conditions that may be caused by different sizes of drops of water. In particular, the illustrative embodiments recognize and take into account that it may be desirable to detect drops of supercooled liquid water. These drops may take the form of supercooled large drops.

Figure 1:
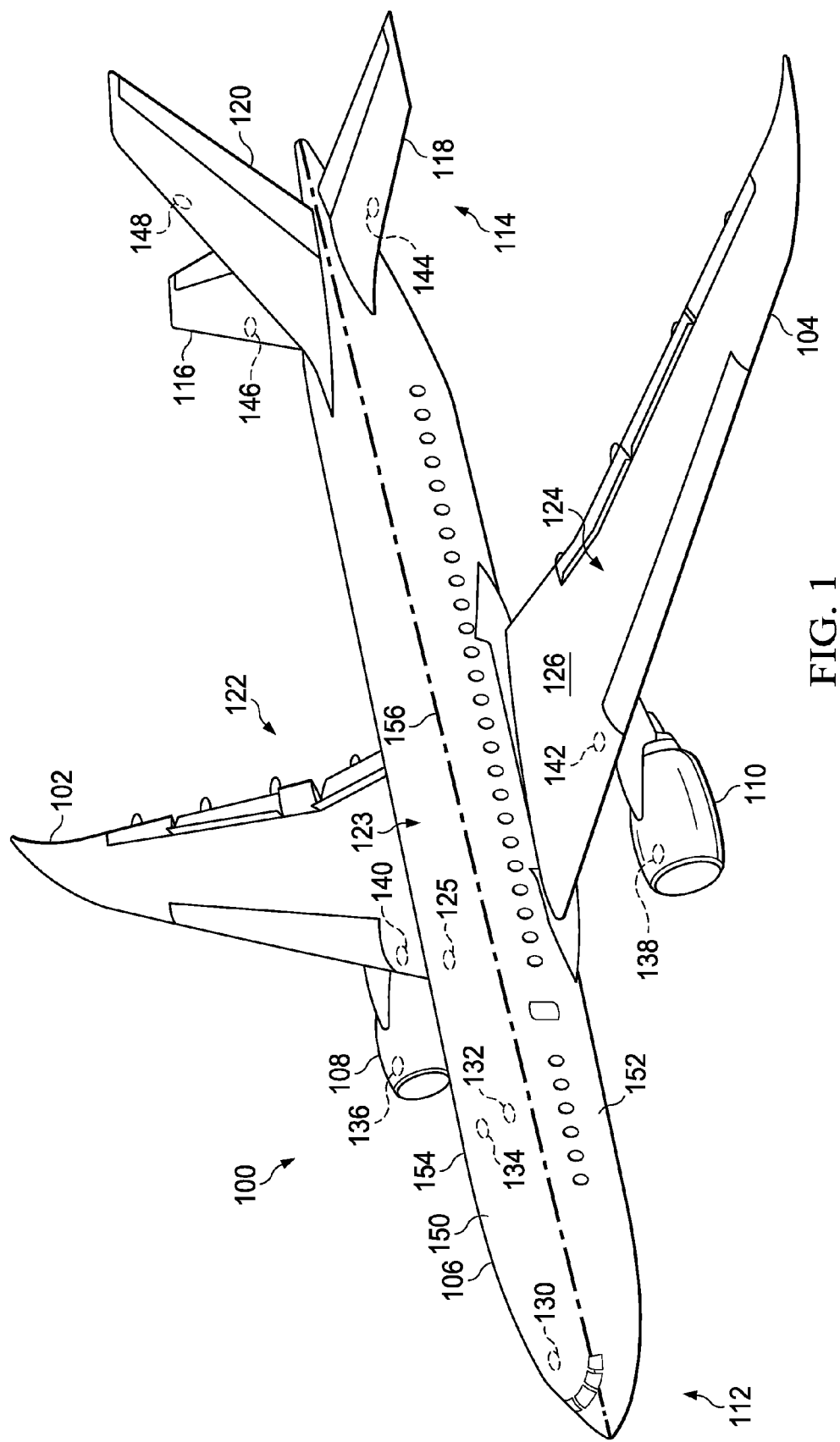
FIG. 1 is an illustration of an aircraft in accordance with an illustrative embodiment.

With reference now to the figures and, in particular, with reference to FIG. 1, an illustration of an aircraft is depicted in accordance with an illustrative embodiment. In this illustrative example, aircraft 100 has wing 102 and wing 104 attached to fuselage 106. Aircraft 100 also includes engine 108 attached to wing 102 and engine 110 attached to wing 104.

Fuselage 106 has nose section 112 and tail section 114. Nose section 112 is the forward part of aircraft 100, while tail section 114 is the aft part of aircraft 100. Horizontal stabilizer 116, horizontal stabilizer 118, and vertical stabilizer 120 are attached to tail section 114 of fuselage 106.

Aircraft 100 is an example of an aircraft in which icing condition detection system 122 may be implemented in accordance with an illustrative embodiment. In these illustrative examples, icing condition detection system 122 comprises sensors 124 on surface 126 of aircraft 100.

In these illustrative examples, icing condition detection system 122 is configured to detect a number of types of icing conditions. For example, icing condition detection system 122 may be configured to detect a first type of icing condition for aircraft 100, a second type of icing condition for aircraft 100, or both.

In these illustrative examples, sensors 124 are configured to emit electromagnetic radiation into drops of water that may be around aircraft 100. In these illustrative examples, the electromagnetic radiation takes the form of coherent light or a laser beam. Further, sensors 124 are configured to detect responses to the electromagnetic radiation and generate data from the responses. In this illustrative example, sensors 124 may take the form of laser sensors 123. Temperature sensor 125 is also depicted in addition to sensors 124.

In these illustrative examples, the data from sensors 124 may be analyzed to detect a presence of drops of water. Further, the data also may be used to identify a size of the drops of water. The size of the drops of water may be substantially uniform or may vary. For example, the size of the drops of water may vary between different drops within the drops of water. These variations may fall within a range. With this information provided by the sensors, a number of types of icing conditions, such as the first type of icing condition and the second type of icing condition, may be detected.

Temperature data may be obtained from temperature sensor 125 in icing condition detection system 122. In another illustrative example, temperature data may be obtained from the aircraft air data system. In these illustrative examples, the data identifying the size of the drops of water may be used with temperature data to determine whether a number of types of icing conditions are present.

In these illustrative examples, sensors 124 in icing condition detection system 122 may be located in different locations on surface 126 of aircraft 100. As depicted, sensors 124 comprise sensors 130, 132, 134, 136, 138, 140, 142, 144, 146, and 148.

In these illustrative examples, sensors 130, 132, and 134 are located on fuselage 106 of aircraft 100. In this illustrative example, sensor 130 is located on top side 150 of fuselage 106. Sensor 132 is located on side 152 of fuselage 106, while sensor 134 is located on side 154 of fuselage 106. Side 152 and side 154 are opposite of each other on fuselage 106. In this illustrative example, sensor 134 is shown in phantom on side 154 of fuselage 106.

In these illustrative examples, sensors 130, 132, and 134 are located at or above horizontal center line 156 in fuselage 106. Due to the relative position of these sensors, sensors 130, 132, and 134 may be in locations that avoid or reduce exposure to runway debris when aircraft 100 taxis on a runway.

Sensor 136 and sensor 138 are located on the engine housings of engine 108 and engine 110, respectively. Sensor 140 is located on wing 102, while sensor 142 is located on wing 104. Sensor 146 is located on horizontal stabilizer 116, and sensor 144 is located on horizontal stabilizer 118. Sensor 148 is located on vertical stabilizer 120.

The illustration of sensors 124 is not meant to imply physical or architectural limitations to the manner in which sensors may be located on aircraft 100 or other aircraft. In these illustrative examples, although 10 sensors are illustrated for sensors 124, other numbers of sensors may be implemented. For example, only a single sensor may be present in icing condition detection system 122 instead of a number of sensors 124. In another example, one or more additional temperature sensors may be present in icing condition detection system 122.

In other illustrative examples, sensors 124 may include two sensors, three sensors, or some other number of sensors. In one illustrative example, sensor 130 may be used without other sensors in sensors 124. In another illustrative example, sensor 132 and sensor 134 may be the only sensors in sensors 124 used in icing condition detection system 122. With two or more sensors in sensors 124, a desired level of redundancy for detecting different types of icing conditions may be provided.

In these illustrative examples, these icing conditions may occur at different altitudes and temperatures that cause the formation of ice on aircraft 100. For example, icing conditions may be present at an altitude from about sea level to about 30,000 feet when the temperature is from about −40 degrees Celsius to about zero degrees Celsius. Of course, other altitudes and temperatures may be present at which ice may be formed from water that contacts surface 126 of aircraft 100. Icing conditions also may be present when the liquid water content in the drops is from about 0.4 to about 2.8 grams/cubic meter at the altitude and temperature range described above.

As depicted, the first type of icing condition and the second type of icing condition are caused by drops of water of different sizes. Although the altitude, temperature, and liquid water content ranges may be the same, one difference between the first and second types of icing conditions is the drop size.

In these illustrative examples, the first type of icing condition may be present when the size of the drops is from about 0.00465 millimeters in diameter to about 0.111 millimeters in diameter. Drops with these sizes may be referred to as normal drops. The second type of icing condition may be present when the size of the drops includes drops that have a diameter greater than about 0.111 millimeters. Drops having a size greater than about 0.111 millimeters may be referred to as large drops and, in particular, may be called supercooled large drops under the altitude, temperature, and liquid water content conditions described above. For example, the drops may have a diameter with a range from about 0.112 millimeters to about 2.2 millimeters. In addition, the second type of icing condition may include drops that are about 0.111 millimeters or less when drops greater than about 0.111 millimeters are present.

As depicted, sensors 124 are configured to detect the size of the drops of water that may be present around aircraft 100. For example, sensors 124 may be configured to detect drops of water having a first number of sizes as well as drops of water having a second number of sizes. In these illustrative examples, the first number of sizes is smaller than the second number of sizes. The number of sizes may be a range of sizes in these illustrative examples.

For example, the first number of sizes may be from about 0.00465 millimeters in diameter to about 0.111 millimeters in diameter. The second number of sizes may be from about 0.112 millimeters in diameter to about 2.2 millimeters in diameter.

The second number of sizes of the drops of water may be drops of water that are considered to be drops of supercooled water. The drops of supercooled water may be supercooled large drops (SLD) of water. Sensors 124 in icing condition detection system 122 are configured to detect drops of water having sizes for both the first type of icing condition and the second type of icing condition.

In the illustrative examples, the first type of icing condition may be referred to as a normal icing condition. The second type of icing condition may be referred to as a supercooled large drop icing condition.

In these illustrative examples, sensors 124 are depicted as flush mounted sensors. In other words, each sensor in sensors 124 may be substantially flush or planar with surface 126 of aircraft 100. With flush mounted sensors, the use of sensors 124 may not add to the drag on aircraft 100. Further, other numbers of sensors 124 and locations for sensors 124 may be used in addition to or in place of those illustrated for aircraft 100 in FIG. 1.

Although particular conditions and sizes for drops have been described for the first icing condition and the second icing condition, the different illustrative embodiments are not limited to the conditions and sizes depicted. For example, other altitudes and drop sizes may be used to define when drops of water are present for the first icing condition and the second icing condition.

However, while FIG. 1 illustrates embodiments using a twin-engine aircraft, the illustrative embodiments recognize and take into account that the information contained is also applicable to aircraft with different numbers of engines. Further, the illustrative example depicts aircraft 100 as a commercial aircraft. The different illustrative embodiments may be applied to other types of aircraft, such as military aircraft, an airplane, a helicopter, or other suitable aircraft.

Figure 2:
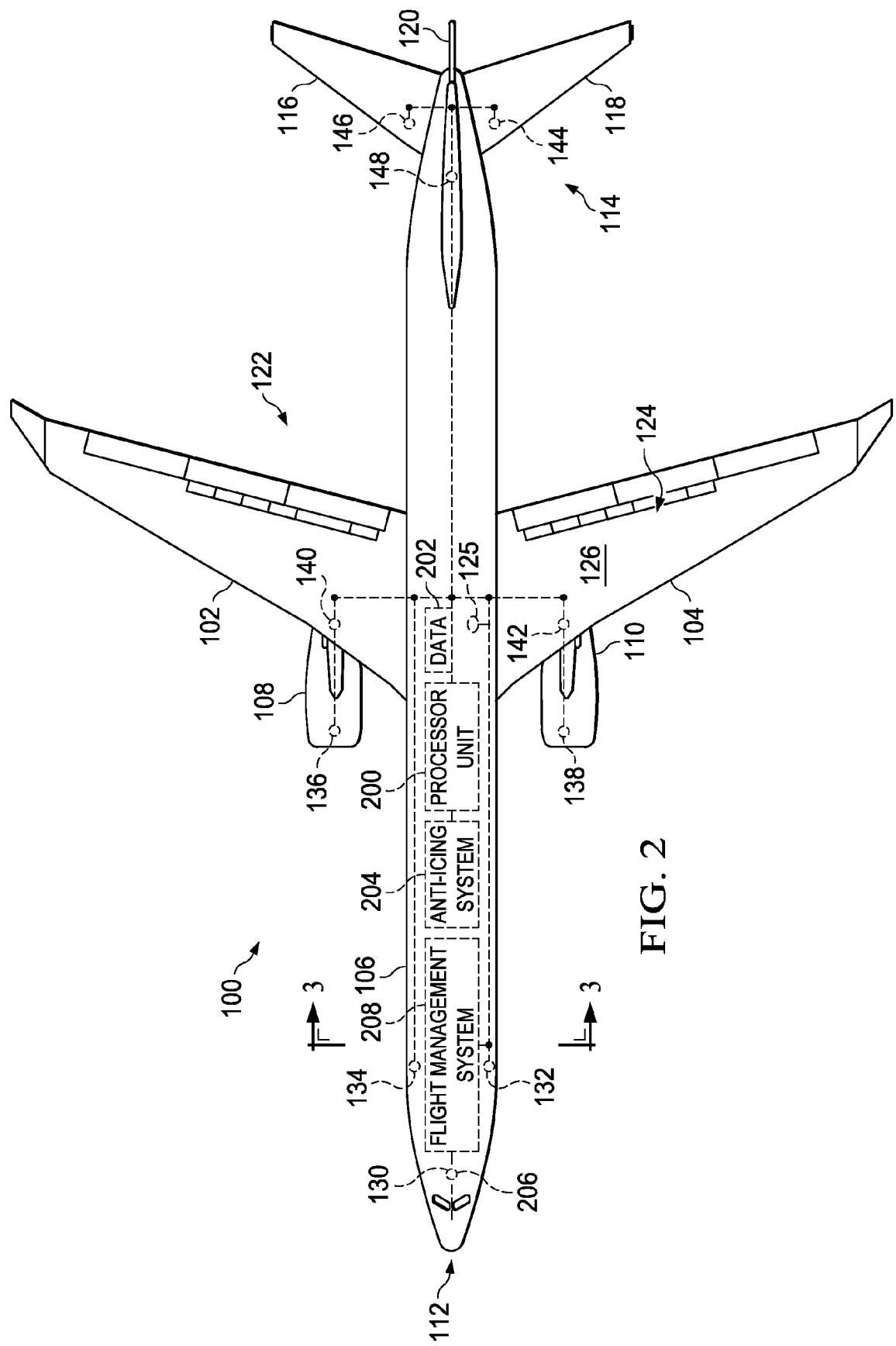
FIG. 2 is an illustration of components in an icing condition detection system in accordance with an illustrative embodiment.

With reference now to FIG. 2, an illustration of components in an icing condition detection system is depicted in accordance with an illustrative embodiment. In this illustrative example, icing condition detection system 122 further comprises processor unit 200. Processor unit 200 is a hardware device configured to perform operations with respect to detecting icing conditions for aircraft 100. These operations may be implemented in software, hardware, or a combination of the two.

As illustrated, processor unit 200 is connected to sensors 124. In these illustrative examples, sensors 124 generate data 202. Data 202 may indicate whether sensors 124 detect a presence of drops of water around aircraft 100. An icing condition is detected by sensors 124 when drops of water are detected in the responses to the electromagnetic radiation, and the temperature around aircraft 100 is about freezing or less than about freezing. The type of icing condition detected may be identified based on a number of sizes of the drops of water as detected by sensors 124. Sensors 124 send data 202 to processor unit 200.

In these illustrative examples, processor unit 200 is an example of an icing condition detector that is configured to monitor the data from sensors 124. Further, processor unit 200 is configured to perform an action in response to the data indicating a presence of one of the icing conditions. The particular type of icing condition detected depends on which group of sensors generating data indicates a presence of ice. In other words, the first icing condition, the second icing condition, or both the first icing condition and the second icing condition may be present, depending on the data generated by sensors 124.

The action may include at least one of generating an alert, generating a log entry, activating anti-icing system 204, sending a report, and other suitable actions. As used herein, the phrase "at least one of", when used with a list of items, means different combinations of one or more of the listed items may be used and only one of each item in the list may be needed. For example, "at least one of item A, item B, and item C" may include, without limitation, item A, or item A and item B. This example also may include item A, item B, and item C, or item B and item C.

In these illustrative examples, the alert may be generated on flight deck interface 206 for aircraft 100. Flight deck interface 206 is a display system located in the flight deck of aircraft 100. The display system comprises a number of displays on which information may be displayed to operators. These displays are hardware devices in the illustrative examples. The number of displays may include, for example, without limitation, a primary flight display, a navigation display, and other suitable types of displays.

Further, the log entry may be generated in flight management system 208. Flight management system 208 is a computer system in aircraft 100. This computer system may be comprised of a number of computers. When more than one computer is present in the computer system, those computers may be in communication with each other using communications media, such as a local area network.

Processor unit 200 may send a report to flight management system 208. Alternatively, the report may be sent to a remote location in addition to or in place of sending the report to flight management system 208. In these illustrative examples, the report may include an indication of what type of icing condition or conditions is present. This report also may include a location of the sensor or sensors detecting the icing condition.

Another action that processor unit 200 may take is to initiate the operation of anti-icing system 204. Anti-icing system 204 may be implemented using any currently available anti-icing system. Anti-icing system 204 may employ different types of mechanisms to remove or prevent the formation of ice on surface 126 of aircraft 100. For example, anti-icing system 204 may employ mechanical systems, chemical systems, infrared heating systems, and other types of systems to remove ice, prevent the formation of ice, or both on surface 126 of aircraft 100.

Figure 3:
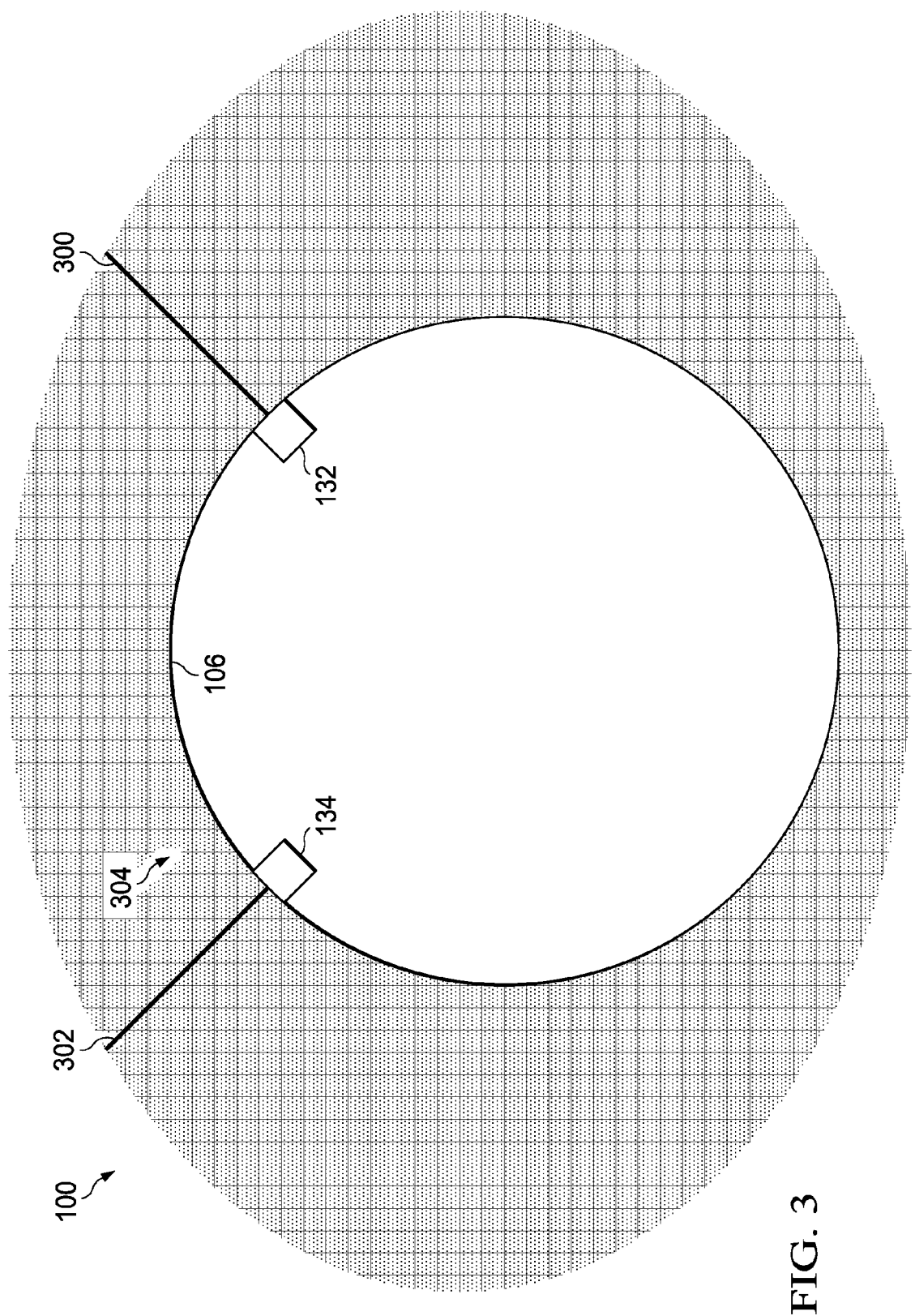
FIG. 3 is an illustration of a cross-sectional view of an aircraft with sensors in accordance with an illustrative embodiment.

With reference now to FIG. 3, an illustration of a cross-sectional view of an aircraft with sensors is depicted in accordance with an illustrative embodiment. In this illustrative example, a view of fuselage 106 is seen taken along lines 3-3 in FIG. 2.

As depicted, sensor 132 is configured to emit electromagnetic radiation 300 into the area around aircraft 100. In a similar fashion, sensor 134 is configured to emit a beam of electromagnetic radiation 302 into the environment around aircraft 100. As depicted, electromagnetic radiation 302 may take the form of coherent light. In one example, electromagnetic radiation 302 may be a laser beam. The laser beam may be in the visible light spectrum or outside the visible light spectrum, depending on the particular implementation.

In these illustrative examples, the beam of electromagnetic radiation 300 and the beam of electromagnetic radiation 302 may be emitted into drops 304 of water. Drops 304 may be drops of water falling through the sky or drops of water in clouds.

In these illustrative examples, sensor 132 and sensor 134 are configured to detect responses from emitting the beam of electromagnetic radiation 300 and the beam of electromagnetic radiation 302 into drops 304. These sensors generate data per use by processor unit 200 in FIG. 2 as described above. The data may actually include sizes for the drops of water or may be used to identify the sizes of drops 304.

The illustration of aircraft 100, icing condition detecting system 122, and other components in FIGS. 1-3 are not meant to imply physical or architectural limitations to the manner in which other illustrative embodiments may be implemented. For example, other numbers of sensors or other locations for the sensors may be used in addition to those illustrated in these figures.

Figure 4:
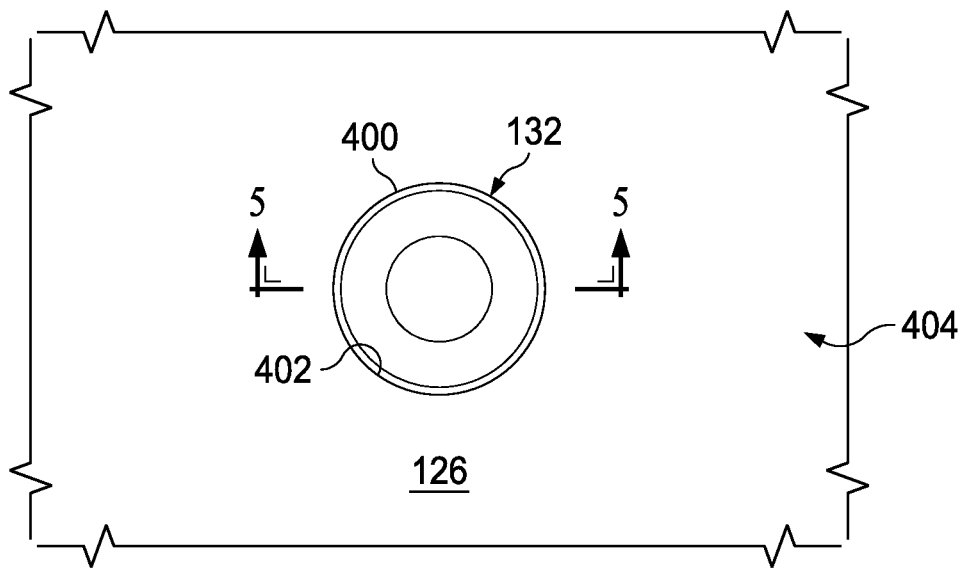
FIG. 4 is an illustration of a sensor in accordance with an illustrative embodiment.

With reference now to FIG. 4, an illustration of a sensor is depicted in accordance with an illustrative embodiment. In this view, a more-detailed illustration of sensor 132 is shown.

Sensor 132 includes housing 400. Housing 400 is designed to fit within opening 402 in surface 126 of fuselage 106 in FIG. 1. Housing 400 is configured to have a shape that is substantially flush to surface 126 when placed into opening 402. Further, the shape of housing 400 is such that housing 400 substantially conforms to curvature 404 in surface 126.

Figure 5:
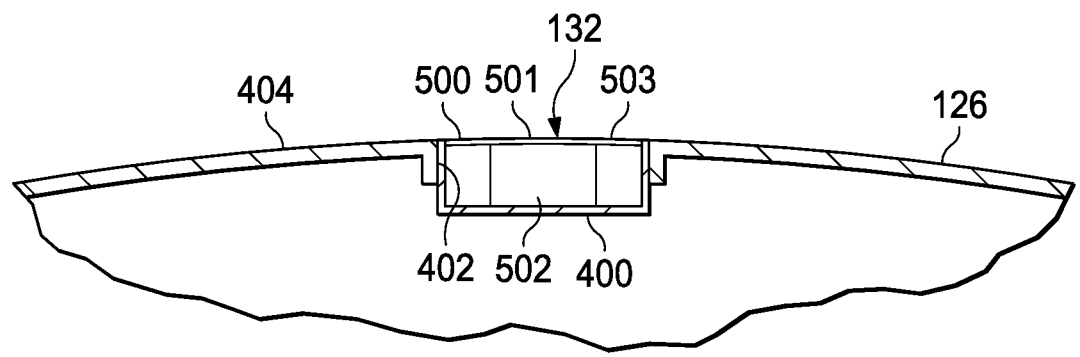
FIG. 5 is an illustration of a cross-sectional view of a sensor installed in an aircraft fuselage in accordance with an illustrative embodiment.

Turning now to FIG. 5, an illustration of a cross-sectional view of a sensor installed in an aircraft fuselage is depicted in accordance with an illustrative embodiment. In this illustrative example, a cross-sectional view of sensor 132 is seen taken along lines 5-5 in FIG. 4.

In this illustrative example, surface 500 of housing 400 includes cover 501. Cover 501 is substantially transparent such that electromagnetic radiation in the form of a laser beam generated by laser sensor unit 502 inside of housing 400 may pass through cover 501. Further, a response to the laser beam also may be detected by laser sensor unit 502 through cover 501.

In this view, housing 400 is depicted such that surface 500 of housing 400 is substantially flush to surface 126. In particular, surface 500 of housing 400 has curvature 503 such that surface 500 of housing 400 substantially conforms to curvature 404 of surface 126 of aircraft 100.

Figure 6:
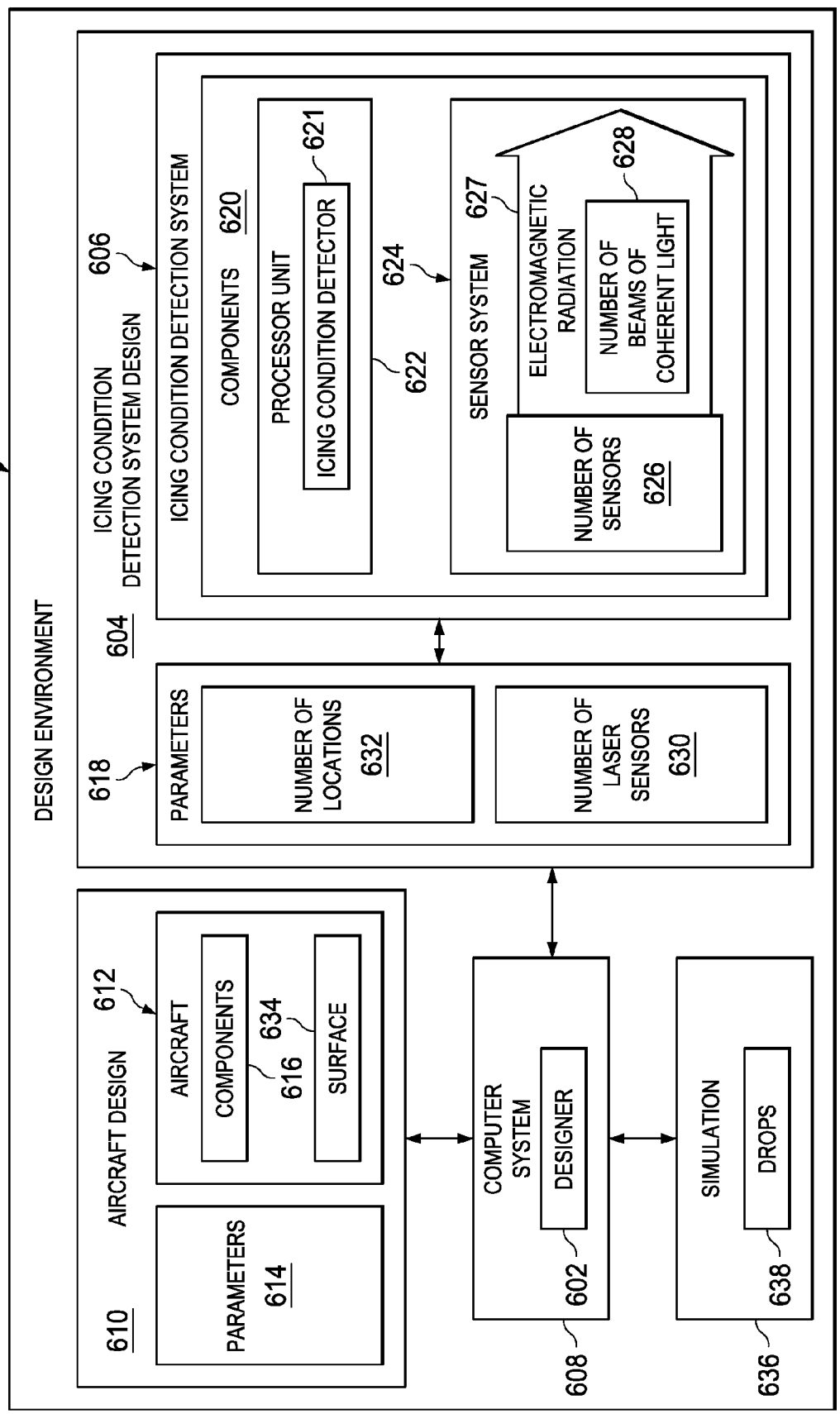
FIG. 6 is an illustration of a block diagram of a design environment in accordance with an illustrative embodiment.

Turning now to FIG. 6, an illustration of a block diagram of a design environment is depicted in accordance with an illustrative embodiment. In this illustrative example, design environment 600 may be used to design an icing condition detection system for a number of different types of icing conditions.

In this illustrative example, designer 602 may be used to generate icing condition detection system design 604 for icing condition detection system 606. Icing condition detection system 606 may be, for example, without limitation, icing condition detection system 122 in FIG. 1.

As illustrated, designer 602 may be implemented using software, hardware, or a combination of the two. In these illustrative examples, designer 602 may be implemented in computer system 608. Computer system 608 comprises a number of computers. When more than one computer is present in computer system 608, those computers may be in communication with each other. This communication may be facilitated using a communications medium, such as a network.

When designer 602 is implemented using software, designer 602 may take the form of a program code that is configured to run on one or more computers in computer system 608. When hardware is employed, the hardware may include circuits that operate to perform the operations in designer 602.

In these illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, without limitation, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being.

In this illustrative example, aircraft design 610 for aircraft 612 is used as an input to create icing condition detection system design 604. In particular, parameters 614 for components 616 in aircraft 612 may be used to generate parameters 618 for components 620 in icing condition detection system 606. In particular, parameters 618 may specify that number of sensors 626 takes the form of number of laser sensors 630 in these illustrative examples. In these illustrative examples, components 620 in icing condition detection system 606 include icing condition detector 621 and sensor system 624.

In these illustrative examples, icing condition detector 621 is implemented in processor unit 622. Icing condition detector 621 may be implemented in any hardware, software, or combination of the two that is configured to process data from number of sensors 626 to identify different types of icing conditions.

Sensor system 624 comprises number of sensors 626. In these illustrative examples, number of sensors 626 is selected as one that generates electromagnetic radiation 627. In these examples, electromagnetic radiation 627 takes the form of number of beams of coherent light 628. As depicted, number of beams of coherent light 628 may have a wavelength that is visible or invisible to the human eye. For example, number of beams of coherent light 628 may be in the infrared spectrum.

As depicted, parameters 618 also may include number of locations 632 for number of sensors 626. In these illustrative examples, number of locations 632 may be selected as any number of locations in which number of beams of coherent light 628 will pass through drops of water such that number of sensors 626 may receive responses based on number of beams of coherent light 628 passing through the drops of water.

Further, number of locations 632 also may be selected as locations that reduce or prevent exposure of passengers or other personnel to number of beams of coherent light 628 during operation of aircraft 612. Additionally, number of locations 632 also may be selected to reduce number of beams of coherent light 628 generated by number of sensors 626 from any other aircraft, buildings, or structures during operation of aircraft 612. Number of locations 632 is on surface 634 of aircraft 612 in these illustrative examples.

Simulation 636 may be performed to identify number of locations 632 for number of sensors 626. This simulation may simulate drops 638 around aircraft 612. Through simulation 636, number of locations 632 may be identified where number of beams of coherent light 628 passes through drops 638 and allow for detection of a response from number of beams of coherent light 628 passing through drops 638.

Further, simulation 636 also may be performed to reduce undesired contact by people, aircraft, and other objects by number of beams of coherent light 628 during operation of aircraft 612. In this manner, number of locations 632 may include, for example, without limitation, one of a fuselage, an airfoil, a wing, a horizontal stabilizer, a vertical stabilizer, and an engine housing.

The illustration of design environment 600 in FIG. 6 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Although icing condition detection system design 604 is shown as a separate design from aircraft design 610, icing condition detection system design 604 may be part of aircraft design 610. In other illustrative examples, adjustments may be made to aircraft design 610 based on icing condition detection system design 604.

For example, although electromagnetic radiation 627 has been described as taking the form of number of beams of coherent light 628, electromagnetic radiation 627 may take other forms. For example, electromagnetic radiation 627 may take any form in which a response to electromagnetic radiation 627 passing through drops 638 can be detected in which the response can be used to identify the size of drops 638.

The different components illustrated in FIGS. 1-5 may be combined with components shown in FIG. 6, used with components shown in FIG. 6, or a combination of the two. Additionally, some of the components illustrated in FIGS. 1-5 may be examples of how components shown in block form in FIG. 6 may be implemented as physical structures.

Figure 7:
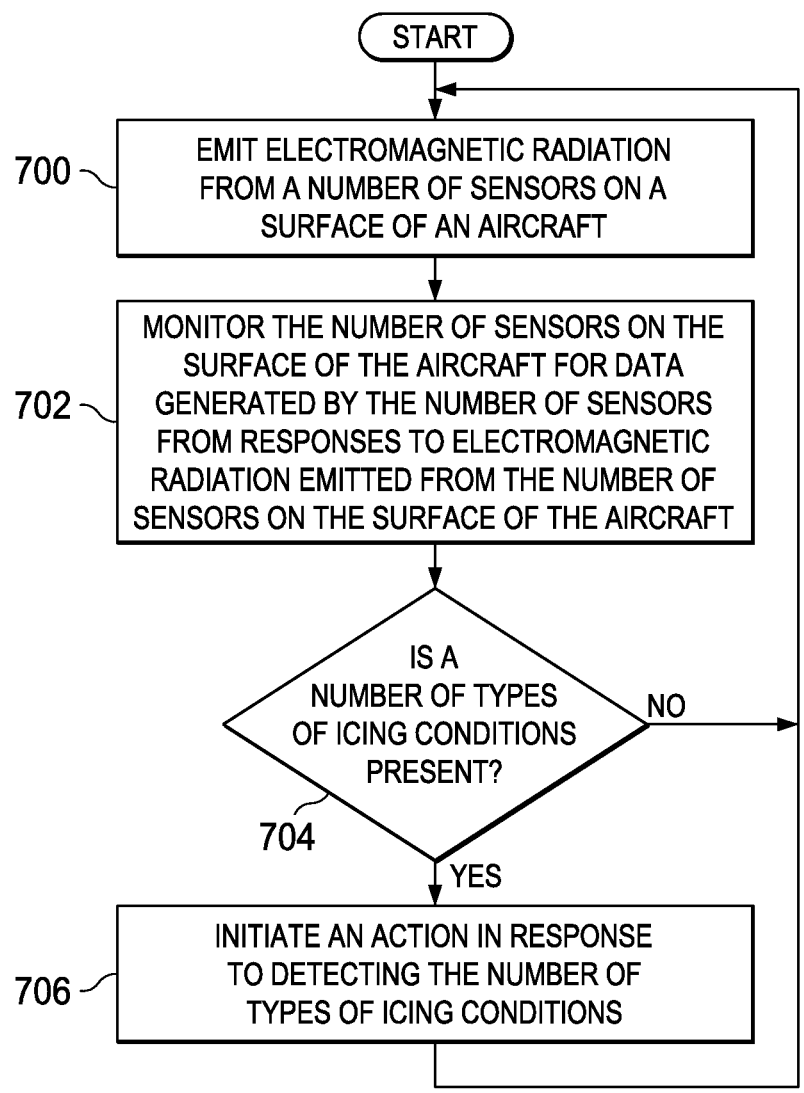
FIG. 7 is an illustration of a flowchart of a process for detecting icing conditions for an aircraft in accordance with an illustrative embodiment.

With reference now to FIG. 7, an illustration of a flowchart of a process for detecting icing conditions for an aircraft is depicted in accordance with an illustrative embodiment. The process illustrated in FIG. 7 may be implemented in an icing condition detection system, such as icing condition detection system 122 in FIG. 1 and icing condition detection system 606 in FIG. 6.

The process begins by emitting electromagnetic radiation from a number of sensors on a surface of an aircraft (operation 700). The process monitors the number of sensors on the surface of the aircraft for data generated by the number of sensors from responses to the electromagnetic radiation emitted from the number of sensors on the surface of the aircraft (operation 702).

A determination is made as to whether a number of types of icing conditions is present using the data from the number of sensors (operation 704). In these illustrative examples, one or more types of icing conditions may be detected by the data from the sensor systems. These types of icing conditions may include a supercooled large drop icing condition.

If a number of types of icing conditions is not present, the process returns to operation 700 as described above. Otherwise, the process initiates an action in response to detecting the number of types of icing conditions (operation 706), with the process returning to operation 700 as described above.

The flowchart and block diagrams in the different depicted embodiments illustrate the architecture, functionality, and operation of some possible implementations of apparatuses and methods in an illustrative embodiment. In this regard, each block in the flowchart or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowchart or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 8:
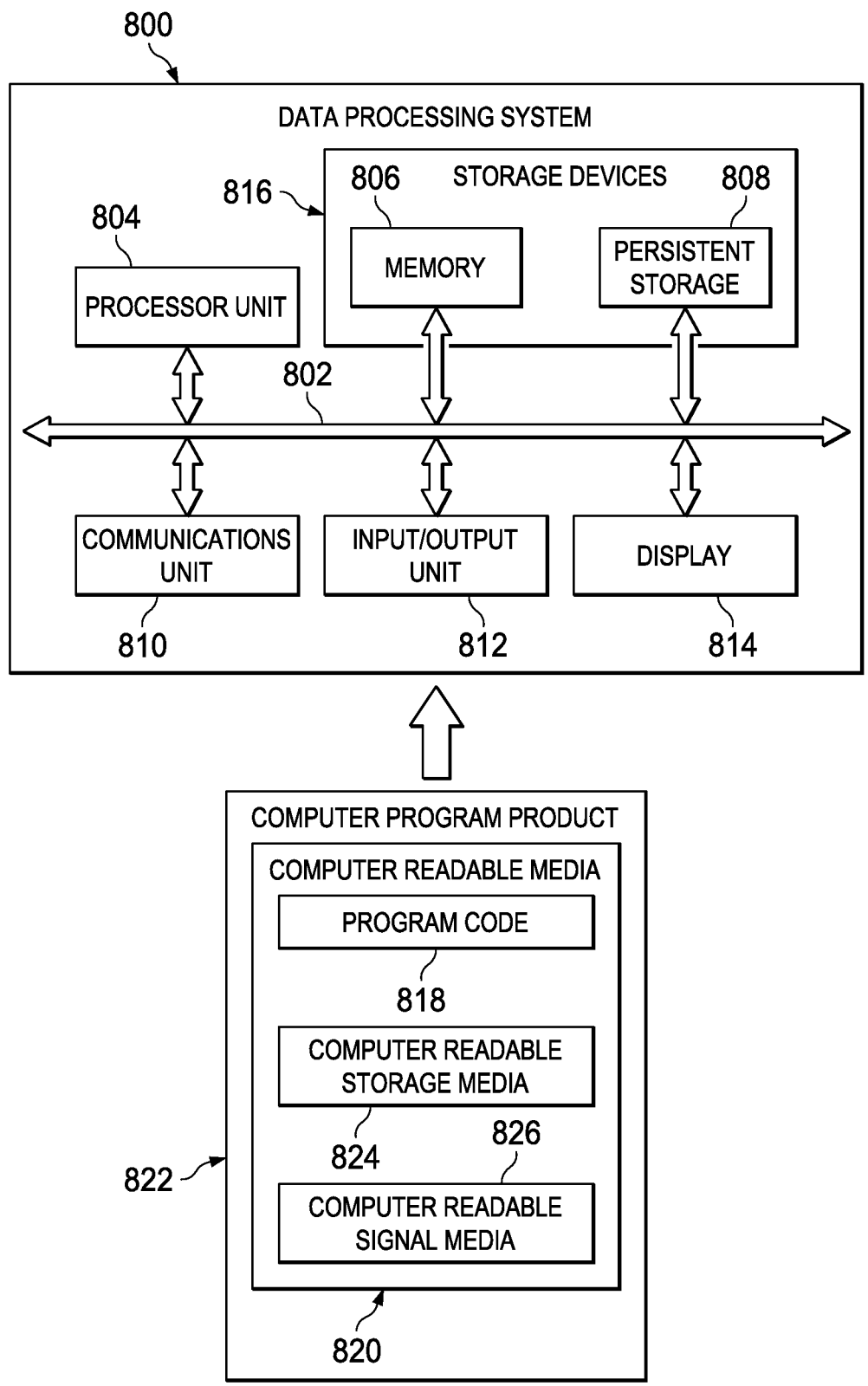
FIG. 8 is an illustration of a data processing system in accordance with an illustrative embodiment.

Turning now to FIG. 8, an illustration of a data processing system is depicted in accordance with an illustrative embodiment. Data processing system 800 may be used to implement flight management system 208 in FIG. 2, computer system 608 in FIG. 6, and other computers that may be used in the different illustrative embodiments. In this illustrative example, data processing system 800 includes communications framework 802, which provides communications between processor unit 804, memory 806, persistent storage 808, communications unit 810, input/output (I/O) unit 812, and display 814. In this example, communications framework 802 may take the form of a bus system.

Processor unit 804 serves to execute instructions for software that may be loaded into memory 806. Processor unit 804 may be a number of processors, a multi-processor core, or some other type of processor, depending on the particular implementation. Processor unit 804 is an example of a processor unit that may be used to implement processor unit 200 in FIG. 2.

Memory 806 and persistent storage 808 are examples of storage devices 816. A storage device is any piece of hardware that is capable of storing information, such as, for example, without limitation, data, program code in functional form, and/or other suitable information either on a temporary basis and/or a permanent basis. Storage devices 816 may also be referred to as computer readable storage devices in these illustrative examples. Memory 806, in these examples, may be, for example, a random access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a flash memory, a rewritable optical disk, a rewritable magnetic tape, or some combination of the above. The media used by persistent storage 808 also may be removable. For example, a removable hard drive may be used for persistent storage 808.

Communications unit 810, in these illustrative examples, provides for communications with other data processing systems or devices. In these illustrative examples, communications unit 810 is a network interface card.

Input/output unit 812 allows for input and output of data with other devices that may be connected to data processing system 800. For example, input/output unit 812 may provide a connection for user input through a keyboard, a mouse, and/or some other suitable input device. Further, input/output unit 812 may send output to a printer. Display 814 provides a mechanism to display information to a user.

Instructions for the operating system, applications, and/or programs may be located in storage devices 816, which are in communication with processor unit 804 through communications framework 802. The processes of the different embodiments may be performed by processor unit 804 using computer-implemented instructions, which may be located in a memory, such as memory 806.

These instructions are referred to as program code, computer usable program code, or computer readable program code that may be read and executed by a processor in processor unit 804. The program code in the different embodiments may be embodied on different physical or computer readable storage media, such as memory 806 or persistent storage 808.

Program code 818 is located in a functional form on computer readable media 820 that is selectively removable and may be loaded onto or transferred to data processing system 800 for execution by processor unit 804. Program code 818 and computer readable media 820 form computer program product 822 in these illustrative examples. In one example, computer readable media 820 may be computer readable storage media 824 or computer readable signal media 826. In these illustrative examples, computer readable storage media 824 is a physical or tangible storage device used to store program code 818 rather than a medium that propagates or transmits program code 818.

Alternatively, program code 818 may be transferred to data processing system 800 using computer readable signal media 826. Computer readable signal media 826 may be, for example, a propagated data signal containing program code 818. For example, computer readable signal media 826 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 800 are not meant to provide architectural limitations to the manner in which different embodiments may be implemented. The different illustrative embodiments may be implemented in a data processing system including components in addition to and/or in place of those illustrated for data processing system 800. Other components shown in FIG. 8 can be varied from the illustrative examples shown. The different embodiments may be implemented using any hardware device or system capable of running program code 818.

Figure 9:
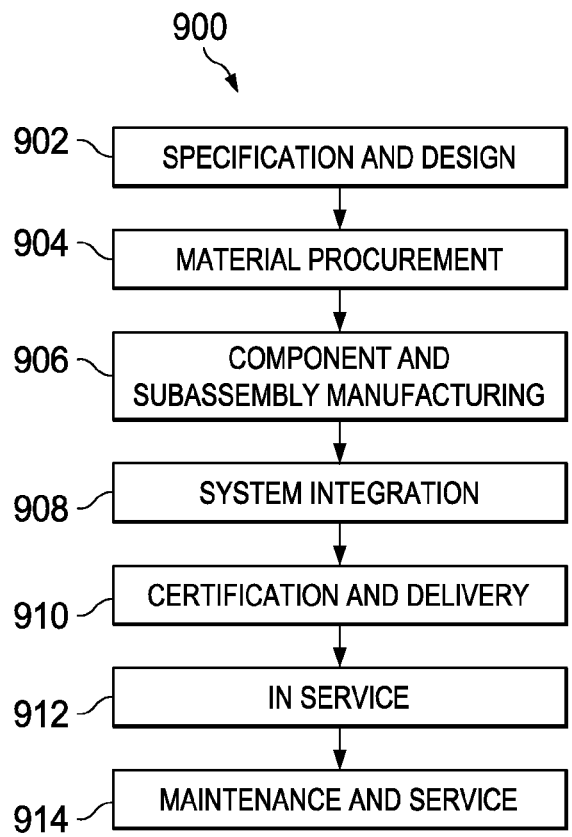
FIG. 9 is an illustration of an aircraft manufacturing and service method in accordance with an illustrative embodiment.
Figure 10:
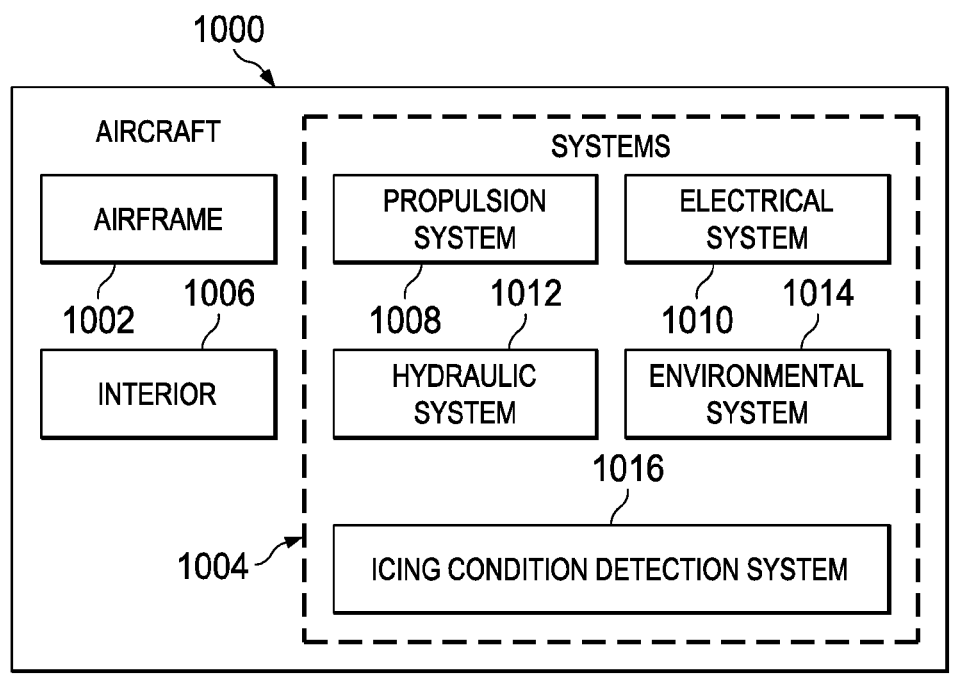
FIG. 10 is an illustration of an aircraft in which an illustrative embodiment may be implemented.

Illustrative embodiments of the disclosure may be described in the context of aircraft manufacturing and service method 900 as shown in FIG. 9 and aircraft 1000 as shown in FIG. 10. Turning first to FIG. 9, an illustration of an aircraft manufacturing and service method is depicted in accordance with an illustrative embodiment. During pre-production, aircraft manufacturing and service method 900 may include specification and design 902 of aircraft 1000 in FIG. 10 and material procurement 904.

During production, component and subassembly manufacturing 906 and system integration 908 of aircraft 1000 takes place. Thereafter, aircraft 1000 may go through certification and delivery 910 in order to be placed in service 912. While in service 912 by a customer, aircraft 1000 is scheduled for routine maintenance and service 914, which may include modification, reconfiguration, refurbishment, and other maintenance or service.

Each of the processes of aircraft manufacturing and service method 900 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 10, an illustration of an aircraft is depicted in which an illustrative embodiment may be implemented. In this example, aircraft 1000 is produced by aircraft manufacturing and service method 900 in FIG. 9 and may include airframe 1002 with a plurality of systems 1004 and interior 1006. Examples of systems 1004 include one or more of propulsion system 1008, electrical system 1010, hydraulic system 1012, environmental system 1014, and icing condition detection system 1016. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 900 in FIG. 9. In one illustrative example, components or subassemblies produced in component and subassembly manufacturing 906 in FIG. 9 may be fabricated or manufactured in a manner similar to components or subassemblies produced while aircraft 1000 is in service 912 in FIG. 9.

As yet another example, one or more apparatus embodiments, method embodiments, or a combination thereof may be utilized during different stages of aircraft manufacturing and service method 900. For example, icing condition detection system 1016 may be designed during specification and design 902. Components for icing condition detection system 1016 may be manufactured during component and subassembly manufacturing 906. Icing condition detection system 1016 may be installed in aircraft 1000 during system integration 908. Icing condition detection system 1016 may be used while aircraft 1000 is in service 912.

In another illustrative example, icing condition detection system 1016 may be an existing ice detection system in aircraft 1000. Upgrades, modifications, and other operations may be performed to modify icing condition detection system 1016 on aircraft 1000 to include features in accordance with an illustrative embodiment.

Thus, one or more illustrative embodiments provide a method and apparatus for identifying different types of icing conditions. In particular, one illustrative embodiment provides an ability to identify a plurality of types of icing conditions, such as a first type of icing condition and a second type of icing condition. The first type of icing condition may be one typically encountered, while the second type of icing condition may be a supercooled large drop icing condition. In these illustrative examples, the ability to identify more than one type of icing condition may allow an aircraft to be certified for flight in different types of icing conditions under various regulations that may be present from government or other regulatory entities, such as the Federal Administration Agency (FAA).

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different benefits as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An icing condition detection system comprising:
    a number of sensors located in a number of locations on an aircraft,
        wherein each sensor in the number of sensors is configured to
            emit electromagnetic radiation into drops of water in an environment around the aircraft and not on a surface of the aircraft,
            detect responses to the electromagnetic radiation emitted into the drops of water in the environment around the aircraft, and
            generate data from the responses including a size of the drops of water in the environment around the aircraft,
        the number of sensors positioned such that at least one sensor is positioned on a first side of a fuselage of the aircraft and a second sensor is positioned on an opposite side of the fuselage of the aircraft;
        wherein the one sensor and the second sensor:
            are each flush mounted being substantially flush with a surface of the aircraft and each having a shape that substantially conforms to a curvature of the surface of the aircraft,
            are at or above a horizontal center line of a fuselage of the aircraft to avoid and reduce exposure to runway debris when the aircraft taxis on a runway, and
            are fitted in the surface of the fuselage of the aircraft;
    a number of temperature sensors associated with the aircraft configured to detect a temperature in the environment around the aircraft; and
    an icing condition detector configured to
        monitor for the data from the number of sensors and the number of temperature sensors and
        detect a presence of a number of types of icing conditions for the aircraft using the data from the number of sensors and the number of temperature sensors,
        wherein
            the icing condition detector uses the data from the number of sensors and the number of temperature sensors to identify a number of sizes for the drops of water in the environment around the aircraft and identifies the number of types of icing conditions using the number of sizes for the drops of water in the environment around the aircraft, and
            the number of sensors and the number of temperature sensors are further configured to detect drops of super cooled liquid water in the environment around the aircraft.

2. The icing condition detection system of claim 1, wherein the number of locations is selected from one of a fuselage, an airfoil, a wing, a horizontal stabilizer, a vertical stabilizer, and an engine housing.

3. The icing condition detection system of claim 1, wherein the number of sensors is a number of laser sensors.

4. The icing condition detection system of claim 1, wherein the electromagnetic radiation is coherent light caused by coherent light passing through drops of water present in a cloud through which the aircraft is flying.

5. The icing condition detection system of claim 1, wherein the aircraft is selected from one of a commercial aircraft, a military aircraft, an airplane, and a helicopter.

6. The icing condition detection system of claim 1, wherein the number of locations includes a first engine housing of a first engine of the aircraft, a second engine housing of a second engine of the aircraft, a first wing of the aircraft, a second wing of the aircraft, a first horizontal stabilizer of the aircraft, a second horizontal stabilizer of the aircraft, and a vertical stabilizer of the aircraft.

7. The icing condition detection system of claim 1, wherein the number of types of icing conditions comprises a first type of icing condition and a second type of icing condition.

8. The icing condition detection system of claim 7, wherein the first type of icing condition is caused by first drops having a first number of sizes from about 0.00465 millimeters in diameter to about 0.111 millimeters in diameter and the second type of icing condition is caused by second drops having a second number of sizes from about 0.112 millimeters in diameter to about 2.2 millimeters in diameter.

9. The icing condition detection system of claim 7, wherein the second type of icing condition is a supercooled large drop type of icing condition.

10. The icing condition detection system of claim 7, wherein the icing condition detector is further configured to perform an action in response to data indicating a presence of at least one of the first type of icing condition and the second type of icing condition.

11. The icing condition detection system of claim 10, wherein the action is selected from at least one of generating an alert, generating a log entry, activating an anti-icing system, and sending a report.

12. A method for detecting icing conditions, the method comprising:
    monitoring a number of sensors located in a number of locations on a surface of an aircraft for data generated from responses to electromagnetic radiation emitted from each of the number of sensors on the surface of the aircraft into drops of water present in the environment around the aircraft and not on a surface of the aircraft including a size of the drops of water present in the environment around the aircraft, the number of sensors positioned such that at least one sensor is positioned on a first side of a fuselage of the aircraft and a second sensor is positioned on an opposite side of the fuselage of the aircraft, wherein the one sensor and the second sensor are each flush mounted being substantially flush with a surface of the aircraft and each has a shape that substantially conforms to a curvature of the surface of the aircraft, are at or above a horizontal center line of a fuselage of the aircraft to avoid and reduce exposure to runway debris when the aircraft taxis on a runway, and are fitted in the surface of the fuselage of the aircraft;

monitoring a number of temperature sensors associated with the aircraft configured to detect a temperature in the environment around the aircraft;

monitoring, by an icing condition detector, for the data from the number of sensors and the number of temperature sensors;

detecting, by the icing condition detector, a presence of a number of types of icing conditions for the aircraft using the data from the number of sensors and the number of temperature sensors; and determining, by the icing condition detector, whether the number of types of icing conditions are present using the data from the number of sensors and the number of temperature sensors, the data including a number of sizes for the drops of water present in the environment around the aircraft, the number of sensors and the number of temperature sensors further configured to detect drops of super cooled liquid water in the environment around the aircraft.

13. The method of claim 12, wherein monitoring the number of sensors on the surface of the aircraft for the data generated from the responses to the electromagnetic radiation emitted from each of the number of sensors on the surface of the aircraft into the drops of water present in the environment around the aircraft comprises:

monitoring the number of sensors on the surface of the aircraft for first data indicative of a first type of icing condition and for second data indicative of a second type of icing condition generated from the responses to the electromagnetic radiation emitted from each of the number of sensors on the surface of the aircraft into the drops of water present in the environment around the aircraft; wherein determining whether the number of types of icing conditions is present using the data from the number of sensors and the number of temperature sensors includes determining whether at least one of the first type of icing condition from the first data and the second type of icing condition from the second data is present.

14. The method of claim 12, wherein monitoring the number of sensors on the surface of the aircraft for the data generated from the responses to the electromagnetic radiation emitted from each of the number of sensors on the surface of the aircraft into the drops of water present in the environment around the aircraft comprises:

monitoring a number of laser sensors on the surface of the aircraft for data generated from responses to the electromagnetic radiation emitted from each of the number of laser sensors on the surface of the aircraft into the drops of water present in the environment around the aircraft.

15. The method of claim 12, wherein monitoring the number of sensors on the surface of the aircraft for the data generated from the responses to the electromagnetic radiation emitted from each of the number of sensors on the surface of the aircraft into the drops of water present in the environment around the aircraft comprises:

selecting the number of locations on the surface of the aircraft, wherein the number of locations is selected from one of a fuselage, an airfoil, a wing, a horizontal stabilizer, a vertical stabilizer, and an engine housing.

16. The method of claim 12, wherein determining whether the number of types of icing conditions is present using the data from the number of sensors and the number of temperature sensors comprises:

determining whether a supercooled large drop type of icing condition in the number of types of icing conditions is present using the data from the number of sensors and the number of temperature sensors.

17. The method of claim 12 further comprising:
initiating an action in response to detecting the number of types of icing conditions from the data.

18. The method of claim 17, wherein initiating the action in response to detecting the number of types of icing conditions from the data comprises:

selecting the action, wherein the action is selected from at least one of generating an alert, generating a log entry, activating an anti-icing system, and sending a report.

* * * * *